United States Patent
Yang et al.

(10) Patent No.: US 12,040,711 B2
(45) Date of Patent: Jul. 16, 2024

(54) VOLTAGE REGULATION AT LOAD TRANSIENTS

(71) Applicant: MONOLITHIC POWER SYSTEMS, INC., San Jose, CA (US)

(72) Inventors: Zhe Yang, San Jose, CA (US); Daocheng Huang, San Jose, CA (US); Faisal Ahmad, San Jose, CA (US); Odai Alsmadi, San Jose, CA (US)

(73) Assignee: Monolithic Power Systems, Inc., Kirkland, WA (US)

( * ) Notice: Subject to any disclaimer, the term of this patent is extended or adjusted under 35 U.S.C. 154(b) by 250 days.

(21) Appl. No.: 17/737,755

(22) Filed: May 5, 2022

(65) Prior Publication Data

US 2023/0361677 A1 Nov. 9, 2023

(51) Int. Cl.
*H02M 3/158* (2006.01)
*H02M 1/00* (2006.01)

(52) U.S. Cl.
CPC ......... *H02M 3/158* (2013.01); *H02M 1/0009* (2021.05)

(58) Field of Classification Search
CPC . H02M 3/1584; H02M 3/1586; H02M 3/1566
See application file for complete search history.

(56) References Cited

U.S. PATENT DOCUMENTS

| 9,348,345 | B2 | 5/2016 | Lynch et al. |
| 9,584,018 | B2 | 2/2017 | Kelin et al. |
| 10,050,559 | B2 | 8/2018 | Li et al. |
| 10,110,122 | B2 | 10/2018 | Bari et al. |
| 2008/0157743 | A1* | 7/2008 | Martin ................ H02M 3/1584 323/284 |

\* cited by examiner

*Primary Examiner* — Rafael O De Leon Domenech
(74) *Attorney, Agent, or Firm* — Beyer Law Group LLP

(57) ABSTRACT

A multiphase converter provides an output voltage to a load. The multiphase converter receives a load event signal from the load and turns ON at a same time the phases of the multiphase converter to increase the output voltage in response to the load event signal indicating that a load current drawn by the load from the multiphase converter is about to increase. The multiphase converter increases an impedance of low-side switches of the multiphase converter in response to the load event signal indicating that the load current is about to decrease.

13 Claims, 5 Drawing Sheets

VOLTAGE REGULATION AT LOAD TRANSIENTS

TECHNICAL FIELD

The present disclosure is generally directed to electrical circuits and more particularly to power converters.

BACKGROUND

Power converters, such as DC-DC converters, are employed in power supply circuits to provide a regulated output voltage to a load. A DC-DC converter may be a buck converter that converts an input voltage to a lower output voltage, a boost converter that converts the input voltage to a higher output voltage, or a buck-boost converter that is configured to perform buck or boost conversion. A load transient condition occurs when the load current drawn by the load rapidly changes. For example, the load current may rapidly increase or decrease from steady state. Conventional voltage regulation control methods may not allow for fast response to adapt to rapidly changing load conditions, resulting in large output voltage undershoot or overshoot.

BRIEF SUMMARY

In one embodiment, a method of regulating an output voltage of a multiphase converter includes providing the output voltage to a load. A load event signal is received from the load. That a load step-up event is about to occur is detected from the load event signal, the load step-up event being an event when a load current drawn by the load increases from steady state. In response to detecting that the load step-up event is about to occur, all of a plurality of phases of the multiphase converter is turned ON at a same time to start increasing the output voltage from a first level to a second level before the load step-up event actually occurs. The plurality of phases of the multiphase converter is sequentially turned ON in interleaved fashion in response to the output voltage reaching the second level.

The method of regulating the output voltage of the multiphase converter may include detecting that a load step-down event is about to occur, the load step-down event being an event when the load current drawn by the load decreases. In response to detecting that the load step-down event is about to occur, an impedance of low-side switches of a plurality of phases is increased before the load step-down event actually occurs to damp the output voltage.

In another embodiment, a multiphase converter comprises a plurality of phases, each of the phases comprising a high-side switch, a low-side switch, and an output inductor that connects an output node to a switch node formed by the high-side switch and the low-side switch; and a controller that is configured to receive a load event signal from a load that receives an output voltage of the multiphase converter at the output node, the controller being configured to turn ON high-side switches of the plurality of phases at a same time to increase the output voltage from a first level to a second level in response to the load event signal indicating that a load step-up event is about to occur and to sequentially turn ON the high-side switches of the plurality of phases in interleaved fashion in response to the output voltage reaching the second level, wherein the load step-up event is an event when a load current drawn by the load from the multiphase converter increases.

The controller of the multiphase converter may comprise a rising edge detector and the controller is configured to detect the coming load step-up event from a rising edge of the load event signal.

The controller of the multiphase converter may be configured to detect, from the load event signal, that a load step-down event is about to occur, the load step-down event being an event when the load current drawn by the load from the multiphase converter decreases.

The controller of the multiphase converter may comprise a falling edge detector and the controller is configured to detect the coming load step-down event from a falling edge of the load event signal.

The controller of the multiphase converter may be configured to, in response to detecting that the load step-down event is about to occur, increase an impedance of low-side switches of the plurality of phases before the load step-down event actually occurs to damp the output voltage.

These and other features of the present disclosure will be readily apparent to persons of ordinary skill in the art upon reading the entirety of this disclosure, which includes the accompanying drawings and claims.

BRIEF DESCRIPTION OF THE DRAWINGS

A more complete understanding of the subject matter may be derived by referring to the detailed description and claims when considered in conjunction with the following figures, wherein like reference numbers refer to similar elements throughout the figures.

DETAILED DESCRIPTION

In the present disclosure, numerous specific details are provided, such as examples of circuits, components, and methods, to provide a thorough understanding of embodiments of the invention. Persons of ordinary skill in the art will recognize, however, that the invention can be practiced without one or more of the specific details. In other instances, well-known details are not shown or described to avoid obscuring aspects of the invention.

Figure 1:
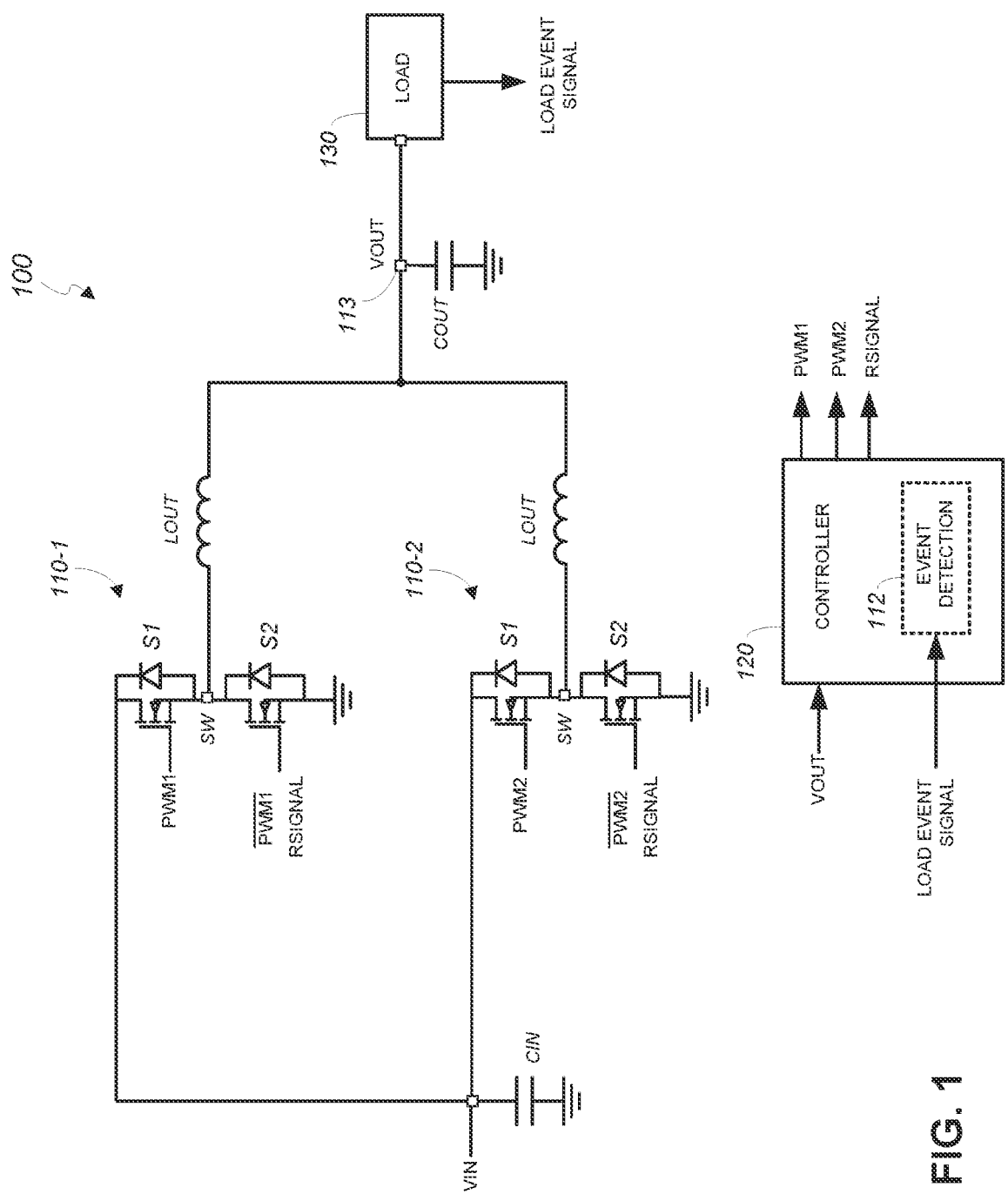
FIG. 1 shows a schematic diagram of a multiphase converter in accordance with an embodiment of the present invention.

FIG. 1 shows a schematic diagram of a multiphase converter 100 in accordance with an embodiment of the present invention. In the example of FIG. 1, the multiphase converter 100 is a buck DC-DC converter. As can be appreciated, embodiments of the present invention are equally applicable to other types of power converters. The multiphase converter 100 receives a DC input voltage VIN across an input capacitor CIN to generate a regulated DC output voltage VOUT across an output capacitor COUT. The output voltage VOUT is provided to a load 130 at an output node 113. The load 130 is external to the multiphase converter 100.

The multiphase converter 100 has circuits for a first phase 110-1 and a second phase 110-2. In general, the multiphase converter 100 may have two or more phases. Each phase 110 (i.e., 110-1 or 110-2) has a high-side switch S1 and a low-side switch S2. The switches S1 and S2 may be metal-oxide-semiconductor field-effect-transistors (MOSFETs), for example. As will be more apparent below, the low-side switch S2 may be implemented by a plurality of transistors and associated logic circuit for increasing the impedance of the low-side switch S2 in response to detecting an upcoming load step-down event.

A first terminal (e.g., drain) of the high-side switch S1 is connected to receive the input voltage VIN. A second terminal (e.g., source) of the high-side switch S1 is connected to a first terminal (e.g., drain) of the low-side switch S2. A second terminal (e.g., source) of the low-side switch S2 is connected to ground. A third terminal (e.g., gate) of the high-side switch S1 receives a control signal in the form of a pulse width modulation (PWM) signal PWM (PWM1 for the phase 110-1; PWM2 for the phase 110-2). The low-side switch S2 receives a NOT-PWM signal (i.e., complement of the PWM signal) and a resistance signal RSIGNAL. A controller 120 generates the resistance signal RSIGNAL to control the impedance of the low-side switch S2, which in the example of FIG. 1 is across the low-side switch S2 between a switch node SW and ground.

An output inductor LOUT has a first end that is connected to the switch node SW formed by the high-side switch S1 and the low-side switch S2. A second end of the output inductor LOUT is connected to the output node 113 where the output voltage VOUT is provided to the load 130.

The low-side switch S2 is OFF when the high-side switch S1 is ON. Conversely, the high-side switch S1 is OFF when the low-side switch S2 is ON. As its name indicates, the high-side switch S1 is connected to the input voltage VIN. When the high-side switch S1 is ON and the low-side switch S2 is OFF, the phase 110 is ON and the high-side switch S1 connects the input voltage VIN to the load 130 by way of the output inductor LOUT. On the other hand, when the low-side switch S2 is ON and the high-side switch S1 is OFF, the phase 110 is OFF and the low-side switch S2 connects the load 130 to ground by way of the output inductor LOUT.

The controller 120 is configured to control the operation of the phases 110 of the multiphase converter 100. In one embodiment, the controller 120 is implemented as an integrated circuit (IC) chip with a plurality of pins including a first input pin that receives the output voltage VOUT and a second input pin that receives a load event signal from the load 130. The controller 120 further includes a first output pin that outputs a PWM1 signal for driving the high-side switch S1 of the first phase 110-1, a second output pin that outputs a PWM2 signal for driving the high-side switch S1 of the second phase 110-2, and a third output pin that outputs the resistance signal RSIGNAL.

Turning ON/OFF a PWM signal turns ON/OFF a corresponding high-side switch S1 and thus the corresponding phase 110. In one embodiment, a PWM signal is in the ON state when at a logical HIGH and in the OFF state when at a logical LOW. During normal operation at steady-state load conditions, the controller 120 interleaves the turning ON of the PWM1 and PWM2 signals to sequentially turn ON the phases 110-1 and 110-2 one at a time in interleaved fashion to generate a regulated output voltage VOUT in accordance with a conventional PWM algorithm.

The controller 120 turns ON both of the phases 110-1 and 110-2 at the same time in response to a load event signal from the load 130 indicating that a load step-up event is about to occur. A load step-up event is an event when the load current drawn by the load 130 rapidly increases.

The controller 120 asserts (i.e., generate as a logical HIGH) the resistance signal RSIGNAL in response to the load event signal indicating that a load step-down event is about to occur. A load step-down event is an event when the load current drawn by the load 130 rapidly decreases. The impedance of the low-side switch S2 is increased in response to the asserted resistance signal RSIGNAL. The controller 120 otherwise de-asserts (i.e., generate as a logical LOW) the resistance signal RSIGNAL during normal operations at steady state load conditions.

The controller 120 includes an event detection circuit 112 for detecting, based on the load event signal, load transients that are about to occur. The event detection circuit 112 may include a rising edge detector 200 (shown in FIG. 2) for detecting a rising edge of the load event signal, which indicates that a load step-up event is about to occur. The event detection circuit 112 may further include a falling edge detector 250 (shown in FIG. 3) for detecting a falling edge of the load event signal, which indicates that a load step-down event is about to occur. The controller 120 turns ON both of the phases 110-1 and 110-2 at the same time in response to the load event signal indicating that a load step-up event is about to occur and increases the impedance of the low-side switches S2 in response to the load event signal indicating that a load step-down event is about to occur.

The load 130 may be a central processing unit (CPU) chip, a power management circuit, or other circuit that provides a load event signal as an early warning to indicate an upcoming load transient. For example, the load 130 may be a CPU chip that sends the load event signal before and/or after it performs extensive computation. As another example, the load 130 may be a storage unit that sends the load event signal before and/or after it performs extensive reads or writes. This gives the controller 120 adequate time to prepare for and respond to the load transients.

Figure 2:
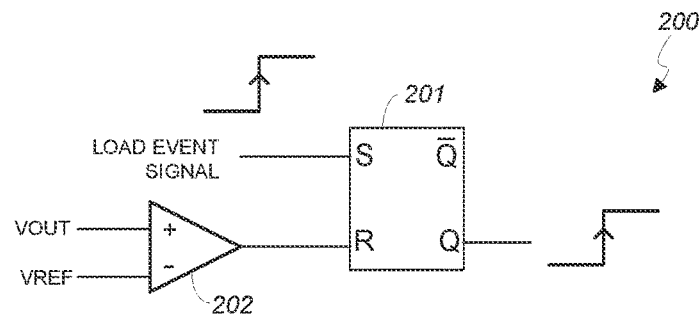
FIG. 2 shows a schematic diagram of a rising edge detector in accordance with an embodiment of the present invention.

FIG. 2 shows a schematic diagram of a rising edge detector 200 in accordance with an embodiment of the present invention. The rising edge detector 200 includes an SR flip-flop 201 and a comparator 202. A rising edge of an event signal from the load 130 (shown in FIG. 1) sets the Q output of the SR flip-flop 201, indicating that a load step-up event is about to occur.

The controller 120 internally generates a reference voltage VREF. In one embodiment, the output voltage VOUT is regulated by the controller 120 to be at the same voltage level as the reference voltage VREF. The controller 120 generates the reference voltage VREF to be at a first voltage level at steady state load conditions. The reference voltage VREF at the first voltage level is also referred to herein as the reference voltage VREF1.

In response to an upcoming load step-up event, the controller 120 increases the reference voltage VREF to a second voltage level that is higher than the first voltage level. The reference voltage VREF at the second voltage level is also referred to herein as the reference voltage VREF2. Increasing the reference voltage from VREF1 to VREF2 causes the output voltage VOUT to increase to VREF2.

Continuing with FIG. 2, the comparator 202 compares the output voltage VOUT to the reference voltage, which is at VREF1 before the rising edge detection and at VREF2 after the rising edge detection. The output of the comparator 202 resets the output Q of the SR flip-flop 201 when the output voltage VOUT exceeds the reference voltage, which would be at VREF2 at that time.

Figure 3:
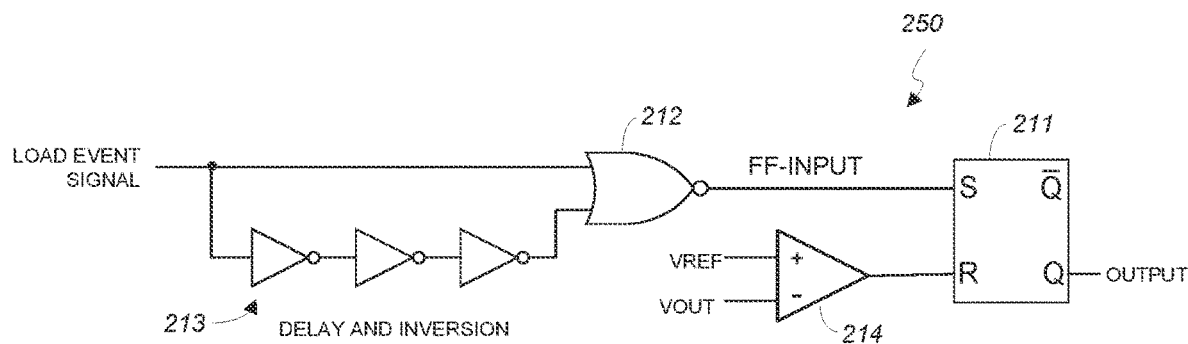
FIG. 3 shows a schematic diagram of a falling edge detector in accordance with an embodiment of the present invention.
Figure 4:
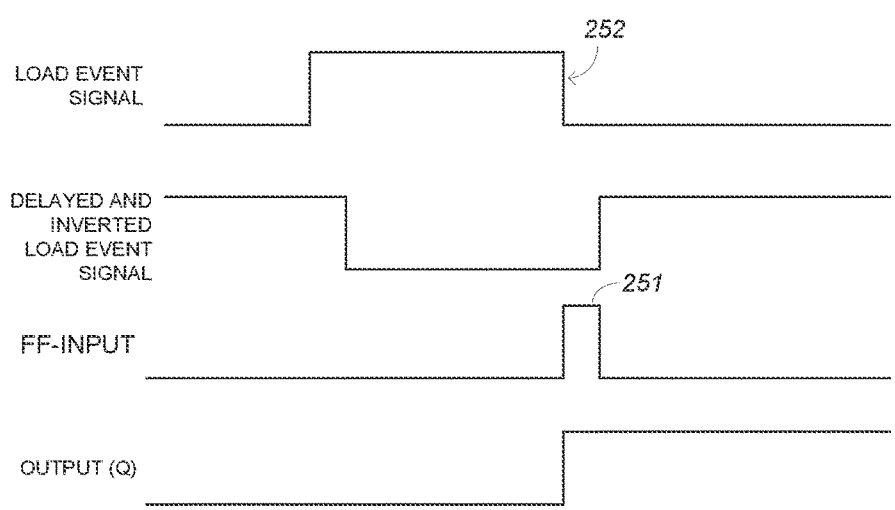
FIG. 4 shows an example timing diagram of the falling edge detector of FIG. 3.

FIG. 3 shows a schematic diagram of a falling edge detector 250 in accordance with an embodiment of the present invention. The falling edge detector 250 includes an SR flip-flop 211, a NOR gate 212, a plurality of NOT gates 213, and a comparator 214. FIG. 4 shows an example timing diagram of the falling edge detector 250. Referring to FIGS. 3 and 4, the NOT gates 213 delay and invert the load event signal from the load 130. The NOR gate 212 performs a NOR logic operation on the load event signal and on the delayed and inverted load event signal, generating a pulse (see FIG. 4, 251) in response to a falling edge (see FIG. 4, 252) of the load event signal. The pulse from the NOR gate 212 sets the SR flip-flop 211 to assert its output Q, indicating that a load step-down event is about to occur.

The comparator 214 compares the output voltage VOUT to the reference voltage VREF, which is internally generated by the controller 120. The reference voltage is at VREF1 before and after the falling edge detection. The output of the comparator 214 resets the output Q of the SR flip-flop 211 when the output voltage VOUT decreases below the reference voltage VREF.

Figure 5:
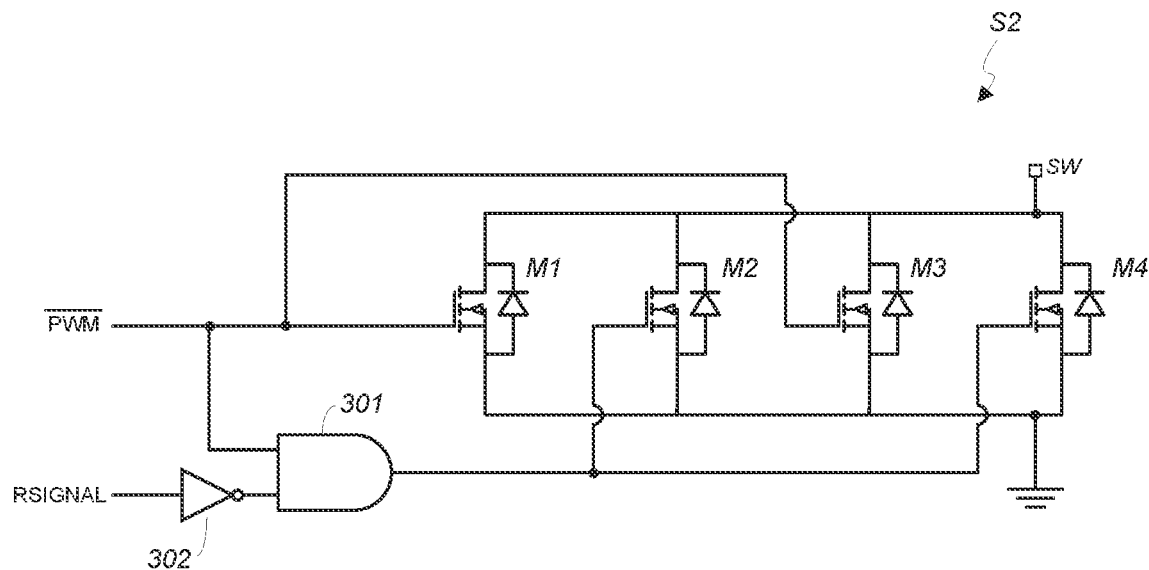
FIG. 5 shows a schematic diagram of a low-side switch in accordance with an embodiment of the present invention.
Figure 6:
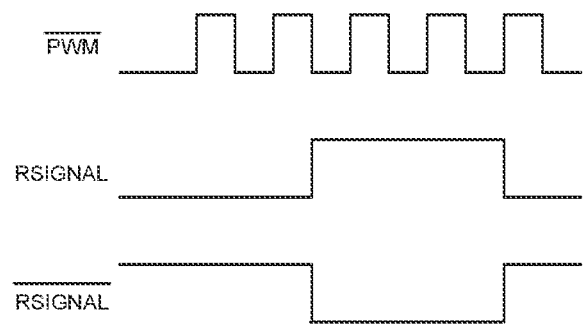
FIG. 6 shows an example timing diagram of the low-side switch of FIG. 5 and associated logic circuit.

FIG. 5 shows a schematic diagram of a low-side switch S2 in accordance with an embodiment of the present invention. FIG. 6 shows an example timing diagram of the low-side switch S2 and associated logic circuit comprising an AND gate 301 and a NOT gate 302.

In one embodiment, the low-side switch S2 is implemented by a plurality of transistors M1-M4 (e.g., MOSFETs). A first end (e.g., drain) of the transistors M1-M4 is connected to a switch node SW (also shown in FIG. 1) and a second end (e.g., source) of the transistors M1-M4 is connected to ground. Four transistors are shown in FIG. 5 for illustration purposes. Additional or fewer transistors may also be employed.

In the example of FIG. 6, the NOT-PWM signal (i.e., complement of the PWM signal that drives a corresponding high-side switch S1) directly controls the switching of the transistors M1 and M3. Therefore, the resistance signal RSIGNAL does not affect the switching of the transistors M1 and M3. On the other hand, the resistance signal RSIGNAL gates the NOT-PWM signal to control the switching of the transistors M2 and M4. More particularly, the NOT gate 302 inverts the resistance signal RSIGNAL presented at the input of the AND gate 301. When the resistance RSIGNAL is asserted by the controller 120, the NOT-PWM signal only controls the switching of the transistors M1 and M3. On the other hand, when the resistance RSIGNAL is de-asserted by the controller 120, the NOT-PWM signal controls the switching of the transistors M1, M2, M3, and M4. The fewer transistors controlled by the NOT-PWM signal, the higher the impedance of the switch S2 between the node SW and ground. The controller 120 can thus increase the impedance of the switch S2 by asserting the resistance signal RSIGNAL. As can be appreciated, other ways of increasing the impedance of the switch S2 may also be employed without detracting from the merits of the present invention.

Figure 7:
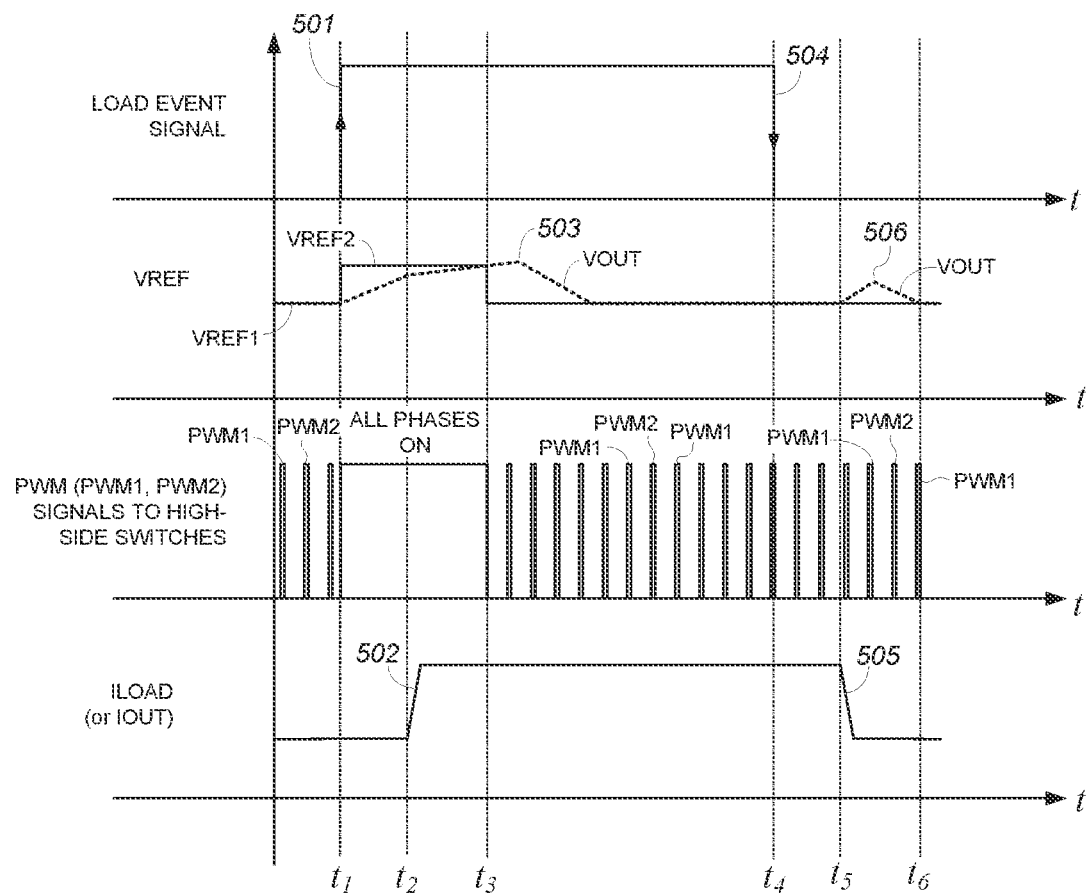
FIG. 7 shows a timing diagram of the multiphase converter of FIG. 1 in accordance with an embodiment of the present invention.

FIG. 7 shows a timing diagram of the multiphase converter 100 in accordance with an embodiment of the present invention. FIG. 7 shows, from top to bottom, a load event signal from the load 130 (shown in FIG. 1), the reference voltage VREF, the output voltage VOUT (dotted line superimposed with VREF), the PWM1 and PWM2 signals to the high-side switches S1 of the phases 110-1 and 110-2, and a load current ILOAD drawn by the load 130. The load current ILOAD is also the output current IOUT of the multiphase converter 100.

Prior to time t1, the load event signal is not asserted and the multiphase converter 100 generates interleaved PWM1 and PWM2 signals to drive the high-side switches S1 such that the phases 110-1 and 110-2 are turned ON one at a time in interleaved fashion. This is shown in FIG. 7 where the PWM1 and PWM2 signals are sequentially turned ON, one at a time. Prior to time t1, the reference voltage is at VREF1 and the output voltage VOUT is at VREF1.

At time t1, a rising edge (see FIG. 7, 501) of the load event signal indicates that a load step-up event is coming. It is to be noted that the load 130 provides the load event signal as an early warning before the load step-up event actually occurs. This can be seen in FIG. 7 where the load current ILOAD does not step-up until at time t2 (see FIG. 7, 502). The time between the rising edge of the load event signal at time t1 and the load step-up at time t2 depends on the application.

At time t1, in response to the load event signal indicating that a load step-up event is about to occur, the controller 120 increases the level of the reference voltage from VREF1 to VREF2 and turns ON both of the phases 110-1 and 110-2 of the multiphase converter 100. This is shown in FIG. 7 where the PWM1 and PWM2 signals are both ON from time t1 to time t3. As a result, the output voltage VOUT starts to increase to VREF2.

At time t2, the load step-up event starts (see FIG. 7, 502). Because the output voltage VOUT was already increasing before the load step-up, the output voltage VOUT does not undershoot even with the rapid increase of the load current ILOAD. Both of the phases 110-1 and 110-2 are still ON from time t2 to time t3, thereby causing the output voltage VOUT to continue to increase to VREF2.

At time t3, the output voltage VOUT reaches the reference voltage VREF2, thereby causing the controller 120 to lower the reference voltage from VREF2 to VRE1. The controller 120 resumes to alternately turn ON the phases 110-1 and 110-2, as shown in FIG. 7 with the PWM1 and PMW2 signals being turned ON in interleaved fashion from the time t3. After a relatively small overshoot (see FIG. 7, 503), the output voltage VOUT decreases back down to VREF1.

At time t4, a falling edge of the load event signal (see FIG. 7, 504) indicates that a load step-down event is about to occur. In response, the controller 120 increases the impedance of the low-side switches S2 to damp output voltage overshoot. In one embodiment, the controller 120 increases the impedance of the low-side switches S2 by asserting the resistance signal RSIGNAL (see FIG. 5). It is to be noted that the load 130 provides the load event signal as an early warning before a load step-down event actually occurs. This can be seen in FIG. 7 where the load current ILOAD does not step-down until at time t5 (see FIG. 7, 505). The time between the falling edge of the load event signal at time t4 and the load step-down at time t5 depends on the application.

At time t5, the load step-down starts (see FIG. 7, 505). Only a relatively small output voltage overshoot (see FIG. 7, 506) occurs because of the increased impedance of the low-side switches S2. The controller 120 releases the impedance of the low-side switches S2 back down to a normal impedance when the output voltage VOUT drops down to VREF1.

Figure 8:
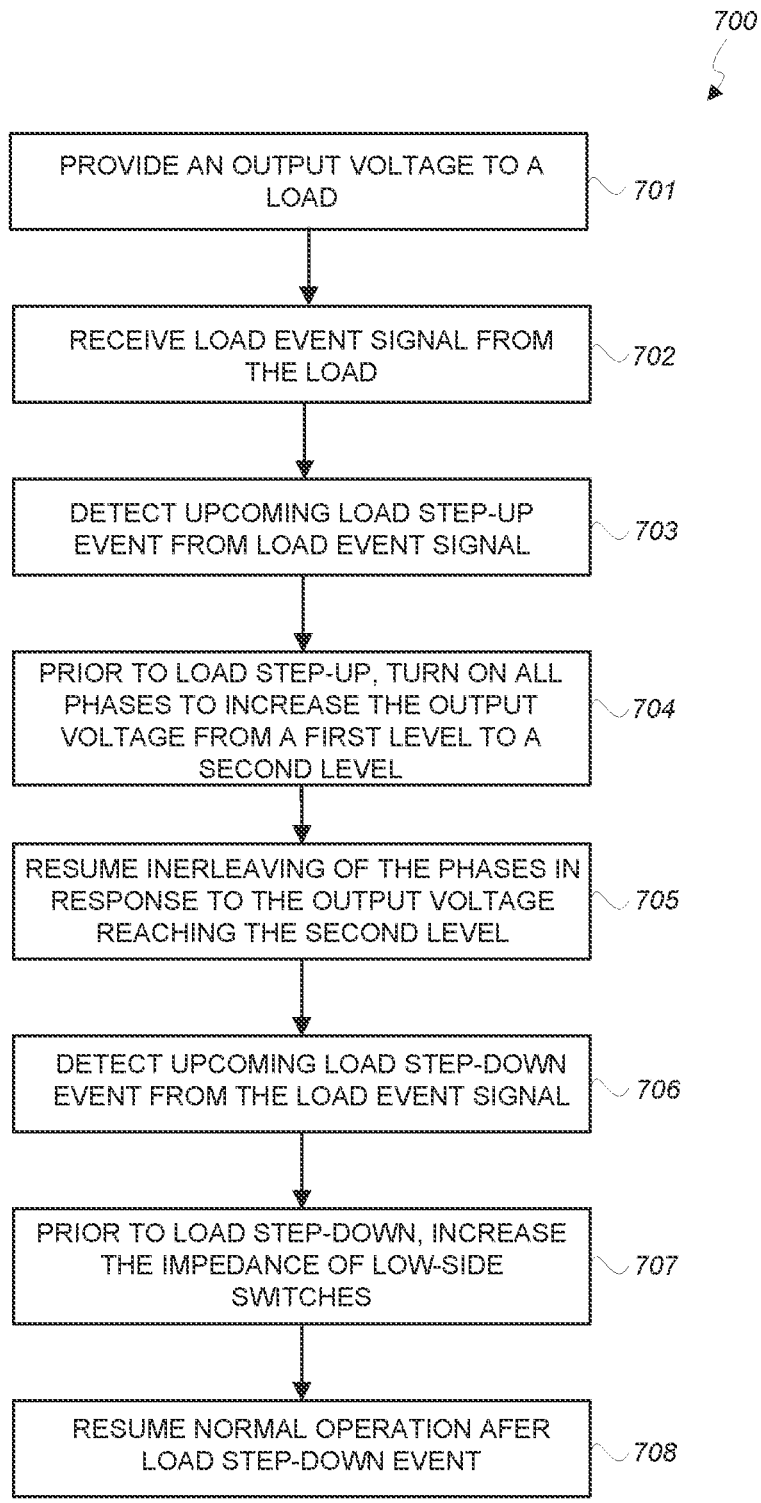
FIG. 8 shows a flow diagram of a method of regulating an output voltage provided to a load in accordance with an embodiment of the present invention

FIG. 8 shows a flow diagram of a method 700 of regulating an output voltage provided to a load in accordance with an embodiment of the present invention. The method 700 may be performed by the multiphase converter 100. As can be appreciated, other components may also be employed without detracting from the merits of the present invention.

In step 701, a multiphase converter receives an input voltage to generate an output voltage that is provided to a load.

In step 702, a controller of the multiphase converter receives a load event signal from the load. In step 703, the controller detects an upcoming load step-up event from the load event signal. The controller may detect the upcoming load step-up event from a rising edge of the load event signal.

In step 704, in response to detecting the upcoming load step-up event, the controller 100 turns ON all the phases of the multiphase converter to increase the output voltage from a first level to a second level prior to the load step-up event. The controller may turn ON all the phases of the multiphase converter by turning ON all the PWM signals that drive the high-side switches of the multiphase converter at the same time. Turning ON all of the phases advantageously prevents undershoot of the output voltage when the load-step up actually occurs.

In step 705, the controller resumes interleaving of all the phases of the multiphase converter in response to the output voltage reaching the second level. The controller may interleave the phases of the multiphase converter by turning ON the phases one at a time in sequence. For example, the controller may interleave the PWM signals that drive the high-side switches.

In step 706, the controller detects an upcoming load step-down event from the load event signal. The controller may detect the upcoming load step-down event from a falling edge of the load event signal.

In step 707, in response to detecting the upcoming load step-down event, the impedance of the low-side switches is increased. The controller may increase the impedance of a low-side switch by, for example, decreasing the number of parallel-connected transistors that make up the low-side switch that are turned ON during turn ON of the low-side switch.

In step 708, the multiphase converter resumes normal operation after the load step-down event. The phases of the multiphase converter are interleaved during normal operation to regulate the output voltage.

While specific embodiments of the present invention have been provided, it is to be understood that these embodiments are for illustration purposes and not limiting. Many additional embodiments will be apparent to persons of ordinary skill in the art reading this disclosure.

What is claimed is:

1. A method of regulating an output voltage of a multiphase converter, the method comprising:
   providing an output voltage of a multiphase converter to a load;
   receiving a load event signal from the load;
   detecting, from the load event signal, that a load step-up event is about to occur, the load step-up event being an event when a load current drawn by the load increases;
   in response to detecting that the load step-up event is about to occur, turning ON all of a plurality of phases of the multiphase converter at a same time to start increasing the output voltage from a first level to a second level before the load step-up event actually occurs; and
   turning ON the plurality of phases of the multiphase converter one at a time in interleaved fashion in response to the output voltage reaching the second level.

2. The method of claim 1, wherein detecting that the load step-up event is about to occur includes detecting a rising edge of the load event signal.

3. The method of claim 1, further comprising:
   detecting, from the load event signal, that a load step-down event is about to occur, the load step-down event being an event when the load current drawn by the load decreases; and
   in response to detecting that the load step-down event is about to occur, increasing an impedance of low-side switches of the multiphase converter to damp the output voltage before the load step-down event actually occurs, wherein the low-side switches are switches that connect the load to ground when corresponding phases of the plurality of phases are turned OFF.

4. The method of claim 3, wherein detecting that the load step-down event is about to occur includes detecting a falling edge of the load event signal.

5. The method of claim 1, further comprising:
   generating a reference voltage;
   in response to detecting that the load step-up event is about to occur, increasing the reference voltage from the first level to the second level;
   comparing the output voltage to the reference voltage; and
   lowering the reference voltage to the first level when the output voltage reaches the second level.

6. A multiphase converter comprising:
   a plurality of phases, each of the plurality of phases comprising a high-side switch, a low-side switch, and an output inductor that connects an output node to a switch node formed by the high-side switch and the low-side switch; and
   a controller that is configured to receive a load event signal from a load that receives an output voltage of the multiphase converter at the output node, the controller being configured to turn ON the high-side switches of the plurality of phases at a same time to increase the output voltage from a first level to a second level in response to the load event signal indicating that a load step-up event is about to occur and to turn ON the high-side switches of the plurality of phases one at a time in interleaved fashion in response to the output voltage reaching the second level,
   wherein the load step-up event is an event when a load current drawn by the load from the multiphase converter increases.

7. The multiphase converter of claim 6, wherein the controller comprises a rising edge detector and the controller detects that the load step-up event is about to occur from a rising edge of the load event signal.

8. The multiphase converter of claim 6, wherein the controller is configured to detect, from the load event signal, that a load step-down event is about to occur, the load step-down event being an event when the load current drawn by the load from the multiphase converter decreases.

9. The multiphase converter of claim 8, wherein the controller comprises a falling edge detector and the controller detects that the load step-down event is about to occur from a falling edge of the load event signal.

10. The multiphase converter of claim 9, wherein the controller is configured, in response to detecting that the load step-down event is about to occur, to increase an impedance of low-side switches of the plurality of phases to damp the output voltage before the load step-down event actually occurs, the low-side switches being switches that connect the load to ground when corresponding phases are turned OFF.

11. The multiphase converter of claim 10, wherein each of the low-side switches comprises a plurality of transistors and the controller is configured to increase the impedance of a low-side switch by decreasing a number of the plurality of transistors that are turned ON when the low-side switch is turned ON.

12. The multiphase converter of claim 11, wherein the controller is configured to generate a reference voltage, to increase the reference voltage from the first level to the second level in response to detecting that the load step-up event is about to occur, to compare the output voltage to the reference voltage, and to interleave the turn ON of the high-side switches of the plurality of phases in response to the output voltage reaching the second level.

13. The multiphase converter of claim 12, wherein the controller is configured to lower the reference voltage from the second level to the first level in response to the output voltage reaching the second level.

\* \* \* \* \*